United States Patent [19]

Castine

[11] 4,109,689
[45] Aug. 29, 1978

[54] APPARATUS FOR PROCESSING TREES

[75] Inventor: Donald G. Castine, Eggertsville, N.Y.

[73] Assignee: Eaton Yale Ltd., Woodstock, Canada

[21] Appl. No.: 806,968

[22] Filed: Jun. 16, 1977

[51] Int. Cl.² ............................................. B27L 1/00
[52] U.S. Cl. ............................ 144/2 Z; 144/309 AC
[58] Field of Search ................... 144/2 Z, 3 D, 34 R, 144/34 E, 309 AC; 83/928

[56] References Cited

U.S. PATENT DOCUMENTS

| | | | |
|---|---|---|---|
| 3,556,180 | 1/1971 | Jones | 144/2 Z |
| 3,612,117 | 10/1971 | Kjell | 144/2 Z |
| 3,713,467 | 1/1973 | Pierrot | 144/2 Z |
| 3,720,246 | 3/1973 | David | 144/2 Z |
| 3,838,721 | 10/1974 | Golob et al. | 144/3 D |
| 3,892,266 | 7/1975 | Puna | 144/3 D X |
| 3,894,568 | 7/1975 | Windsor | 144/2 Z |
| 3,960,189 | 6/1976 | Windsor et al. | 144/2 Z X |
| 3,960,190 | 6/1976 | Smith | 144/2 Z |

*Primary Examiner*—Gil Weidenfeld
*Assistant Examiner*—W. D. Bray
*Attorney, Agent, or Firm*—F. M. Sajovec, Jr.

[57] ABSTRACT

A method and apparatus for processing trees in which a clamp holding a severed tree for processing pulls the tree through a set of delimbing blades, while at the same time the blades are moved in the opposite direction along the tree trunk. A system of pulleys and cables driven by a single hydraulic cylinder moves a movable boom and a processing head in one direction relative to a stationary boom, while a clamp assembly is moved in the opposite direction relative to the stationary boom.

14 Claims, 4 Drawing Figures

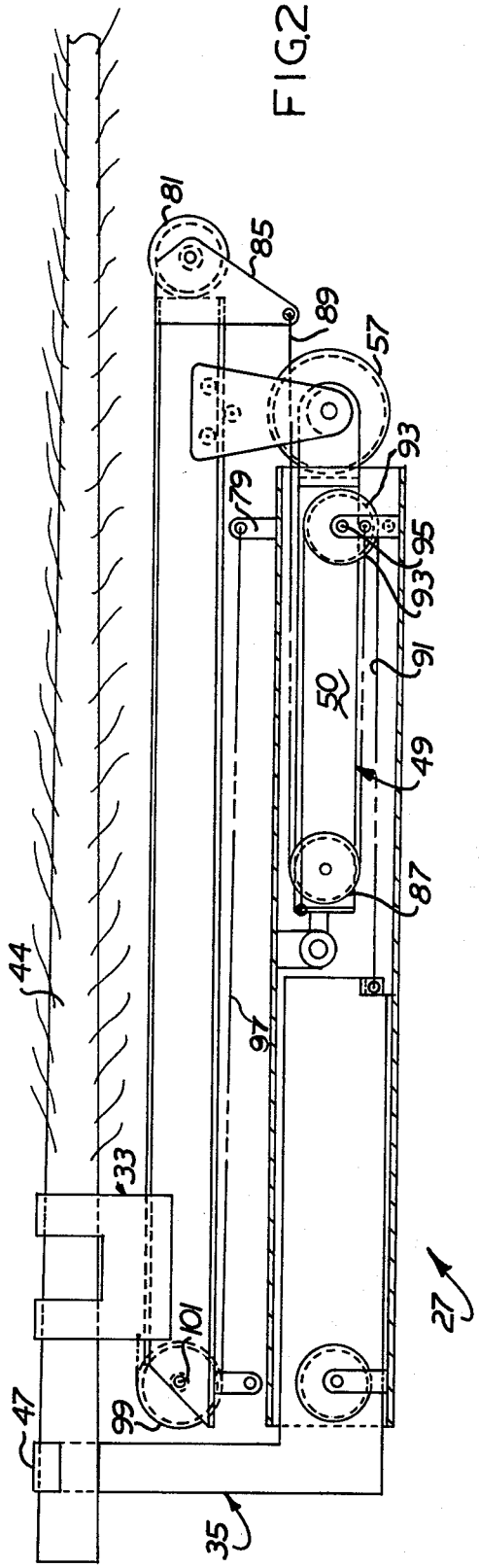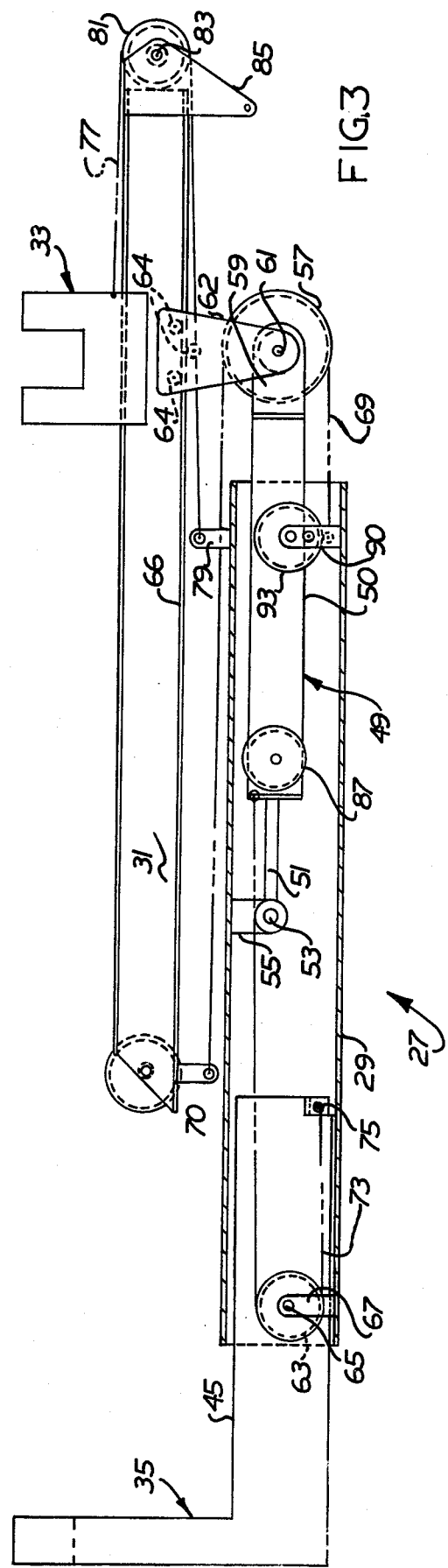

4,109,689

APPARATUS FOR PROCESSING TREES

The present invention relates to improved apparatus for harvesting trees, and more particularly to apparatus for increasing the capacity of a known type of harvester.

U.S. Pat. No. 3,894,568 discloses a tree harvester in which a felling head is used to hold a tree for delimbing and topping by means of a processing head travelling along a horizontal processing boom. U.S. Pat. No. 3,618,647 discloses a similar type of tree harvester which includes a secondary clamp, which holds the tree in position for processing while the felling head is simultaneously advanced to a second tree.

Tree harvesters of the above type are generally designed to handle trees up to a selected maximum height. When trees of a significantly larger size are to be harvested, it is generally difficult to increase the capacity of a given machine without adversely affecting the stability and overall efficiency of the machine. Accordingly, it is usually necessary to go to a distinct, larger model machine at considerable expense. In situations where most of the trees encountered are within the normal capacity of the machine but a relative few are longer, the longer trees must either be processed by hand, or a harvester which is oversize for most of the trees must be used. Neither of these alternatives is desirable to most loggers.

What the present invention seeks to provide is means for significantly increasing the processing capacity of a known type of tree harvester without adversely affecting the stability and overall efficiency of the machine.

Accordingly, it is an object of the present invention to provide an established model tree harvester with means to increase its capacity without substantially redesigning and increasing the overall size of the machine.

Another object of the invention is to provide means to increase capacity as above while at the same time converting an established machine from one of single tree capacity to one of multiple tree capacity, that is, the capacity to process more than one tree at a time.

Another object of the invention is to provide a tree harvester of the type having a fixed boom, a boom movable with respect to the fixed boom, and a processing head movable with respect to the movable boom with means for effectively increasing the length of the movable boom.

Another object of the invention is to provide a harvester as above with a secondary clamp which is movable relative to the movable boom and opposite thereto.

Another object of the invention is to provide a secondary clamp which is mounted on the stationary boom and which is movable in response to the movement of the secondary boom but in the opposite direction thereof.

Another object of the invention is to provide a harvester in which the movable boom, the processing head, and the movable secondary clamp are part of an integrated system driven by a single motor.

To meet the above objectives, the present invention provides a tree harvester of the type disclosed in U.S. Pat. No. 3,894,568 which is incorporated herein by reference, to which a secondary clamp is added at the forward end of the stationary processing boom between the felling head in its tree depositing position and the processing head. The secondary clamp is mounted on an elongated carriage mounted for movement along the longitudinal axis of the stationary boom. A hydraulic cylinder is mounted on the stationary boom and is operatively connected to a system of pulleys and reeved cables interconnecting the movable boom, the processing head, and the secondary clamp.

After a first tree is deposited with its butt end in the jaws of the secondary clamp the felling head is advanced to a second tree. At the same time, the hydraulic cylinder driving the processing system is extended, moving the movable boom and the processing head toward the rear of the machine and the secondary clamp toward the front of the machine, the combined extension of the movable boom and the secondary clamp, and the movement of the processing head relative thereto defining a machine capacity which is substantially greater than that of the basic machine both in terms of tree length capacity and in terms of the numbers of trees which can be processed in a given time.

Other objects and advantages of the invention will become more apparent from the following description when taken in connection with the accompanying drawings, wherein:

FIG. 2 is a schematic representation of a portion of the harvester of FIG. 1, shown partly in elevation and partly in section;

FIG. 3 is a view similar to FIG. 2, but illustrating the invention in a second operative position.

Figure 1:
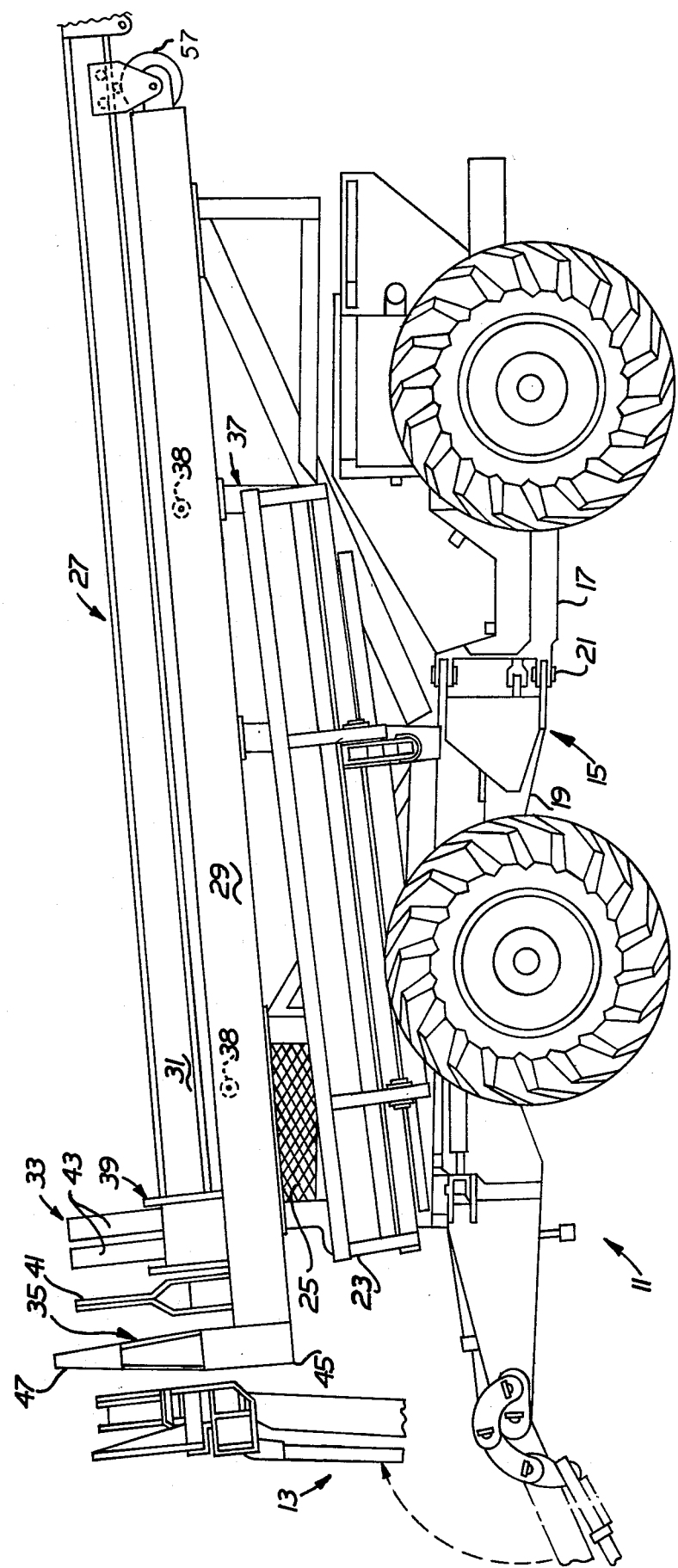
FIG. 1 is an elevation view of a tree harvester constructed in accordance with the present invention.

Referring to FIG. 1, there is illustrated a tree harvester, designated generally by the numeral 11. The harvester 11 includes a felling assembly 13, illustrated fragmentarily, which is operable to sever a standing tree and to position it on the harvester for processing, in a known manner.

The harvester 11 is preferably an articulated vehicle 15 having a trailing end section 17 and a leading end section 19 connected at a pivot connection 21. A bunk 23 is mounted on the leading section 19 at one side of the vehicle for receiving processed trees, and an operator's cab 25 is mounted on the opposite side.

The harvester 11 includes a processing boom assembly, designated generally by the numeral 27, which includes a stationary boom assembly 29, a movable boom assembly 31, a processing head 33, and a clamp assembly 35.

The stationary boom 29 is rigidly attached to the leading section 19 by means of a support structure designated generally by the numeral 37. The movable boom section 31 is mounted on roller assemblies 38 acting between it and the stationary boom section 29.

The processing head 33 is mounted on rollers (not shown) acting between it and the movable boom section 31, and comprises a delimbing head 39 and a topping shear 41. The delimbing head 39 comprises a set of delimbing blades 43 engageable with the trunk of a tree 44 deposited on the processing boom and are operable to strip the branches off the tree as the delimbing head moves along the movable boom, as will be described in more detail later. The topping shear is operable to cut off the top of the tree after a usable length of the trunk has been delimbed. Details of typical delimbing heads and topping shears as described above can be found in U.S. Pat. No. 3,894,568 and will not be described in further detail herein.

The clamp assembly 35 comprises a frame 45 and a movable arm 47 pivotally attached to the frame 45 and movable between an open position as shown in FIG. 1, and a closed position in which it firmly clamps a tree which has been deposited on the processing boom by the felling assembly 13 against a portion of the frame 45. In accordance with the invention the frame 45 is operable to move linearly relative to the stationary boom 29 in conjunction with the movement of the movable boom and the processing head.

Figure 4:
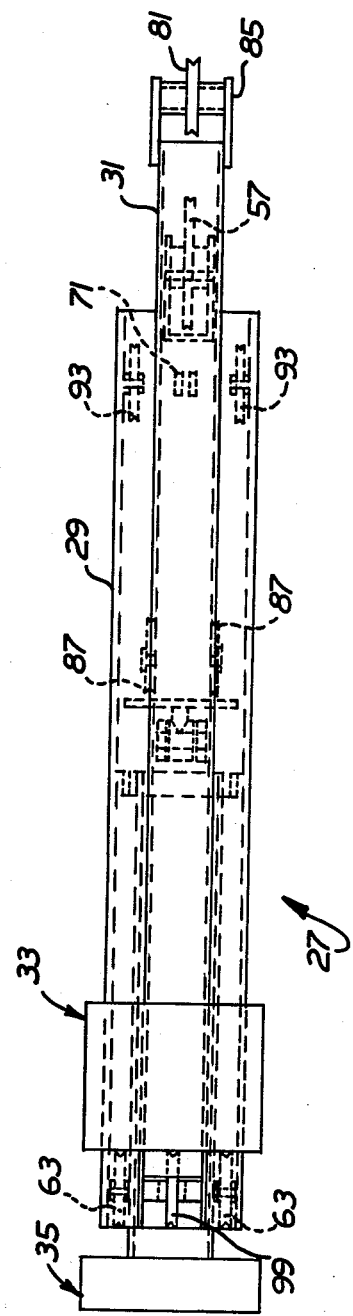
FIG. 4 is a plan view corresponding to FIG. 2.

Referring to FIGS. 2, 3 and 4, the relative positions of the stationary boom, the movable boom, the processing head and the clamp assembly and the means for driving the movable elements, are illustrated schematically. The system for extension is illustrated in FIG. 3, and will be described first.

The stationary boom 29 is hollow and a hydraulic cylinder 49 is mounted within the stationary boom 29 with its piston rod end 51 pivotally attached at 53 to a bracket 55 welded or otherwise fixed to the interior of the boom. A boom extension pulley 57 is rotatably attached at 61 to an extended portion 59 of the head end of body 50 of cylinder 49 at 61. The cylinder body 50 is guided for linear movement by means of a bracket 62 received on the pivot 61 and supported by rollers 64, which ride on the lower flanges 66 of the movable boom 31. A pair of clamp extension pulleys 63 are rotatably attached at 65 to brackets 67 which are welded or otherwise fixed to the forward end of the stationary boom 29.

A boom extension cable 69 is attached at one end to a bracket 70 welded or otherwise fixed to the forward end of the movable boom 31, reeved around the pulley 57 and attached at its other end to the base of a pulley mounting bracket 71 welded or otherwise fixed to the stationary boom 29 adjacent the rear end thereof. Clamp extension cables 73 are attached to the rear end of clamp frame 45 at 75, are reeved around the pulleys 63 and are attached to the body 50 of cylinder 49 adjacent the rod end thereof.

A processing head extension cable 77 is attached at one end to a bracket 79 welded or otherwise fixed to the rear end of stationary boom 29, is reeved around a pulley 81 rotatably mounted at 83 to a bracket 85 welded or otherwise fixed to the rear end of movable boom 31, and attached at the other end to the rear end of the processing head 33.

Comparing FIGS. 2 and 3, when cylinder 49 is pressurized the cylinder body 50 moves to the right pulling cable 69 around pulley 57, thus pulling the movable boom 31 to the right relative to the stationary boom 29. At the same time, cables 73 are pulled around pulleys 63, thus pulling the clamp assembly 35 to the left.

As the movable boom 31 moves to the right, cable 77 is pulled around pulley 81, pulling the processing head 33 to the right relative to the movable boom 31.

Referring to FIG. 2, a pair of boom retraction pulleys 87 are rotatably attached to the cylinder body 50 adjacent the rod end thereof. A pair of boom retraction cables 89 are attached at one end to a pair of brackets 90, which are welded or otherwise fixed adjacent the rear end of boom 29, are reeved around the pulleys 87 and attached at the other end to the bracket 85. A pair of clamp retraction cables 91 are attached at one end to the rear end of the clamp frame 45, are reeved around pulleys 93 rotatably mounted at 95 to the brackets 90 and are attached at the other end to the cylinder body 50 adjacent the rod end thereof.

A processing head retraction cable 97 is attached at one end to the bracket 79, is reeved around a pulley 99 rotatably mounted at 101 to the forward end of the movable boom 31, and is attached at the other end to the forward end of the processing head 33.

When the cylinder 49 is retracted, cables 89 are pulled around pulleys 87, thus pulling the movable boom 31 to the left relative to the stationary boom 29. At the same time, cables 91 are pulled around the pulleys 93, thus pulling the clamp assembly 35 to the right.

When the movable boom 31 moves to the left, cable 97 is pulled around pulley 99, and the processing head 33 is pulled to the left relative to the movable boom 31.

In operation, a processing cycle starts with the processing boom assembly 27 in the position shown in FIGS. 1 and 2. A standing tree 4 is then engaged by the felling assembly, severed, and moved to a substantially horizontal position atop the processing boom assembly 27 with its trunk lying within the clamp assembly 35, the delimbing blades 43 of the delimbing head 39, and within the topping shear 41, in a known manner.

With the tree thus positioned, the clamp arm 47 is closed, clamping the tree against the frame 45, and the delimbing blades 43 are closed against the tree trunk. Cylinder 49 is then pressurized, simultaneously moving the clamp assembly 35 to the left relative to the stationary boom 29, and the movable boom 31 and the processing head 33 to the right, the combined effect being to move the delimbing blades 43 relative to the tree trunk 44 to sever the limbs.

When a usable length of the tree has been delimbed, or when the cylinder 49 reaches the end of its stroke, the topping shear is actuated to cut off the top of the tree, and the clamp arm 47 is opened to allow the delimbed tree to be dropped into the bunk 23. The cylinder 49 is then retracted, moving the movable boom 31 and the processing head to the left, and the clamp assembly to the right, as described above. While the above processing cycle is going on, the felling assembly 13 can be advanced to another tree to sever it and to begin positioning it for processing.

I claim:

1. In apparatus for processing trees, a processing boom assembly comprising a first stationary elongated boom member; a second elongated boom member disposed parallel to said first boom member and mounted for axial movement relative thereto; a processing head mounted on said second boom member for axial movement along said second boom member; a clamp assembly mounted on said first boom member adjacent one end thereof for movement away from and toward said one end; and drive means acting on said movable boom member, said processing head and said clamp assembly, said drive means being effective to move said processing head and said clamp assembly relatively away from one another in a first condition of operation and to move said processing head and said clamp assembly relatively toward one another in a second condition of operation.

2. Apparatus as claimed in claim 1, in which said drive means comprises motor means acting between said first boom and said second boom for moving said second boom relative to said first boom, means acting between said second boom and said processing head for moving said processing head relative to said second boom, and means acting between said motor means and said clamp assembly for moving said clamp assembly relative to said first boom simultaneously with but in opposite directions to said second boom.

3. Apparatus as claimed in claim 1, in which said drive means comprises a hydraulic cylinder having a stationary member attached to said first boom and a movable guided for linear movement relative to said second boom; a first boom extension pulley rotatably mounted on said movable member of said hydraulic cylinder; and a cable attached at one end to said first boom, reeved around said boom extension pulley, and attached at the opposite end to said second boom.

4. Apparatus as claimed in claim 3, in which said drive means includes a boom retraction pulley rotatably mounted on the movable member of said cylinder; and a cable attached at one end to said first boom, reeved around said boom retraction pulley, and attached at the opposite end to said second boom.

5. Apparatus as claimed in claim 3, including means movable along said second boom for guiding movement of the movable member of said hydraulic cylinder relative to said first boom.

6. Apparatus as claimed in claim 5, wherein said second boom comprises at least one flange member extending along the length of said boom, and said means movable along said second boom comprises at least one plate member attached to said movable member of said hydraulic cylinder, and one or more rollers pivotally mounted on said at least one plate member and engageable with said flange member.

7. Apparatus as claimed in claim 1, in which said drive means comprises a processor extension pulley rotatably mounted on said second boom; and a cable attached at one end to said first boom, reeved around said processor extension pulley, and attached at the other end to said processing head.

8. Apparatus as claimed in claim 7, in which said drive means includes a processor retraction pulley rotatably attached to said second boom; and a cable attached at one end to said first boom, reeved around said processor retraction pulley, and attached at the other end to said processing head.

9. Apparatus as claimed in claim 3, in which said drive means comprises a clamp extension pulley rotatably mounted on said first boom; and a cable attached at one end to the movable member of said hydraulic cylinder, reeved around said clamp extension pulley, and attached at the other end to said clamp assembly.

10. Apparatus as claimed in claim 9, in which said drive means includes a clamp retraction pulley rotatably mounted on said first boom; and a cable attached at one end to the movable member of said hydraulic cylinder, reeved around said clamp retraction pulley, and attached at the other end to said clamp assembly.

11. Apparatus as claimed in claim 1, in which said first boom is a hollow tube, and said drive means comprises a hydraulic cylinder received within said first boom and having a body and a piston rod extensible and retractable relative to said body, said piston rod being operatively attached to said first boom; a first pulley rotatably mounted on said cylinder body; a second pulley rotatably mounted on said cylinder body; a first cable reeved around said first pulley and attached at one end to said first boom and at the other end to said second boom; a second cable reeved around said second pulley and attached at one end to said first boom and at the other end to said second boom; a third pulley rotatably mounted on said second boom at or adjacent the rear end thereof; a fourth pulley rotatably mounted the second boom at or adjacent the forward end thereof; a third cable reeved around said third pulley and attached at one end to said first boom and at the other end to said processing head; a fourth cable reeved around said fourth pulley and attached at one end to said first boom and at the other end to said processing head; a fifth pulley rotatably mounted on said first boom; a sixth pulley rotatably mounted on said first boom; a fifth cable reeved around said fifth pulley and attached at one end to said cylinder body and at the other end to said clamp assembly; and a sixth cable reeved around said sixth pulley and attached at one end to said cylinder body and at the other end to said clamp assembly.

12. Apparatus as claimed in claim 11 in which said second pulley is one of a pair of pulleys disposed on opposite sides of said cylinder body, and said second cable is one of a pair of cables reeved over said pair of second pulleys and connected to said first boom and said second boom.

13. Apparatus as claimed in claim 11 in which said fifth pulley is one of a pair of pulleys mounted within said first boom adjacent opposed walls of said first boom, said sixth pulley is one of a pair of pulleys mounted within said first boom adjacent opposed walls of said first boom, and said fifth and sixth cables are each one of pairs of cables reeved over said fifth and sixth pairs of pulleys respectively, and connected to said cylinder body and to said clamp assembly.

14. Apparatus as claimed in claim 11 in which said clamp assembly comprises a frame, and an arm mounted on the frame for movement relative thereto to clamp a tree between the arm and the frame, a portion of said frame being received within said first boom.

* * * * *

UNITED STATES PATENT AND TRADEMARK OFFICE
CERTIFICATE OF CORRECTION

PATENT NO. : 4,109,689

DATED : August 29, 1978

INVENTOR(S) : Donald G. Castine

It is certified that error appears in the above-identified patent and that said Letters Patent are hereby corrected as shown below:

Column 4, line 16: "4" should read "44".

Signed and Sealed this

Tenth Day of April 1979

[SEAL]

Attest:

RUTH C. MASON
Attesting Officer

DONALD W. BANNER
Commissioner of Patents and Trademarks